(12) United States Patent
Lucas

(10) Patent No.: US 8,262,111 B2
(45) Date of Patent: Sep. 11, 2012

(54) LEANING VEHICLE SUSPENSION

(76) Inventor: Steven W. Lucas, Vinton, IA (US)

( * ) Notice: Subject to any disclaimer, the term of this patent is extended or adjusted under 35 U.S.C. 154(b) by 155 days.

(21) Appl. No.: 12/911,889

(22) Filed: Oct. 26, 2010

(65) Prior Publication Data

US 2012/0098225 A1   Apr. 26, 2012

(51) Int. Cl.
   B60G 21/00   (2006.01)
   B60G 3/18    (2006.01)
   B62D 61/06   (2006.01)
(52) U.S. Cl. ................. 280/124.103; 180/210; 180/908; 280/5.509; 280/124.135
(58) Field of Classification Search .................. 180/210, 180/211, 215, 311, 312, 908; 280/5.509, 280/124.103, 124.116, 124.134–124.136, 280/124.156
See application file for complete search history.

(56) References Cited

U.S. PATENT DOCUMENTS

| | | | | |
|---|---|---|---|---|
| 2,260,102 A * | 10/1941 | Freret | ...................... | 280/5.509 |
| 4,088,199 A | 5/1978 | Trautwein | | |
| 4,685,690 A * | 8/1987 | Fujita et al. | ............ | 280/124.103 |
| 4,887,829 A * | 12/1989 | Prince | ............................ | 280/282 |
| 6,267,387 B1 * | 7/2001 | Weiss | ........................... | 280/5.52 |
| 6,763,905 B2 | 7/2004 | Cocco et al. | | |
| 6,817,617 B2 * | 11/2004 | Hayashi | ..................... | 280/5.509 |
| 7,343,997 B1 | 3/2008 | Matthies | | |
| 7,357,400 B2 * | 4/2008 | Serra | ........................ | 280/86.751 |
| 7,407,173 B2 * | 8/2008 | Walker | .................. | 280/124.134 |
| 7,487,985 B1 | 2/2009 | Mighell | | |
| 7,494,141 B2 * | 2/2009 | Bouton | .................. | 280/124.103 |
| 7,530,419 B2 | 5/2009 | Brudeli | | |
| 7,568,541 B2 | 8/2009 | Pfeil et al. | | |
| 7,591,337 B2 | 9/2009 | Suhre et al. | | |
| 7,607,695 B2 * | 10/2009 | Moulene et al. | ............. | 280/775 |
| 7,631,721 B2 | 12/2009 | Hobbs | | |
| 8,104,781 B2 * | 1/2012 | Gazarek | ................. | 280/124.141 |
| 8,123,240 B2 * | 2/2012 | Mercier | .................. | 280/124.103 |
| 2007/0151780 A1 * | 7/2007 | Tonoli et al. | ................. | 180/65.1 |
| 2008/0012262 A1 * | 1/2008 | Carabelli et al. | ....... | 280/124.106 |
| 2009/0160141 A1 | 6/2009 | Spangler | | |

FOREIGN PATENT DOCUMENTS

| | | | | |
|---|---|---|---|---|
| FR | 2534543 A | * | 4/1984 | |
| JP | 01229787 A | * | 9/1989 | |
| WO | 9843872 | | 10/1998 | |
| WO | 9941136 | | 8/1999 | |

OTHER PUBLICATIONS

TreMoto website: http://www.tremoto.com, (2011).
Mystery Designs www.mysterydesigns.com/tiltster.php website, Advanced Creative Endeavors, Dallas, Texas, (2010).

* cited by examiner

Primary Examiner — Paul N Dickson
Assistant Examiner — Laura Freedman
(74) Attorney, Agent, or Firm — Allan J. Harms; Shuttleworth & Ingersoll, PLC

(57) ABSTRACT

A suspension for a motorized rear wheel driven tricycle which can lean into turns includes a planar central upright frame which is mounted coaxially to the main frame of the tricycle. Upper and lower control arms are hinged to the central upright frame and extend to the left and to the right to connect to wheel bearing knuckles. An inverted rocker member is hinged to the central frame, pivotable about the front and rear ends of the central frame at about the midpoint between the top and bottom of the frame. The rocker member provides connection points for shock absorbers which interconnect the rocker member with each link member of the lower control arm on each side of the central frame. Drive members are supported on the central frame to continuously drive the rear wheels as the tricycle leans into turns.

20 Claims, 10 Drawing Sheets

LEANING VEHICLE SUSPENSION

BACKGROUND

The present invention pertains to motorized tricycles, particularly to motorized tricycles which have the separated wheels in the rear and are rear wheel driven. Typical modifications to standard motorcycles to convert them to tricycle operation are by substituting a shortened automobile rear axle and differential for the rear wheel of the motorcycle. However, the ability to lean in a turn is lost when this kind of modification is done.

Previous efforts to make leaning motorized tricycles have stability and complexity shortcomings, including the need for operator attention to controls to cause the motorcycle to lean or to right itself. Examples of such efforts include U.S. Pat. No. 7,334,997 to Matthies and US Patent Publication 2009/0160141 (Spangler). In other cases the separated wheels have been utilized at the front and are steerable but not driven wheels, such as U.S. Pat. No. 7,591,337 to Suhre et al., U.S. Pat. No. 7,568,541 to Pfeil et al. and U.S. Pat. No. 6,763,905 to Cocco, et al.

A motorized rear wheel driven tricycle which is capable of leaning in turns while requiring no drive mechanism to return to upright condition is needed.

SUMMARY OF THE INVENTION

The present invention provides a rear suspension for a rear wheel driven motorized tricycle. The suspension includes a planar central upright frame which is mounted coaxially to the main frame of the tricycle. Upper and lower control arms are hinged to the central upright frame and extend to the left and to the right to connect to wheel bearing housings. An inverted rocker assembly is hinged to the central frame, pivotable about the front and rear ends of the central frame at points located in the upper third of the distance between the top and bottom of the central frame. The inverted rocker assembly provides connection points for shock absorbers which interconnect the inverted rocker assembly with each link member of the lower control arm on each side of the central frame.

The control arms define a parallelogram throughout their operation, whether the rear wheels are leaning or upright, while the rocker rotates about its pivot in the opposite direction from the direction of lean of the central frame.

The connection points of the control arms to the wheel bearing housings are located on the centerline of the rear wheels.

Drive members are supported on the central frame and include chain sprocket or belt pulley components to transmit drive power from the tricycle's engine and transmission to a differential mounted in the central frame. Constant velocity joints along the drive train permit left and right drive axles to continuously propel the rear wheels as the tricycle proceeds forward including when leaning into turns. Brake discs and calipers may be installed on adjacent sides of the differential gear.

It is therefore a primary object of the invention to provide a motorized tricycle with driven rear wheels and a single front wheel, which will lean in turns in the same fashion as an ordinary two wheeled motorcycle. It is further an object of the invention to provide a suspension mechanism which allows a two wheeled motorcycle to be converted into a tricycle which will lean in turns. These and other objects of the invention will be understood from reference to the drawings and detailed description which follows.

BRIEF DESCRIPTION OF THE DRAWING FIGURES

DETAILED DESCRIPTION OF THE INVENTION

Figure 1:
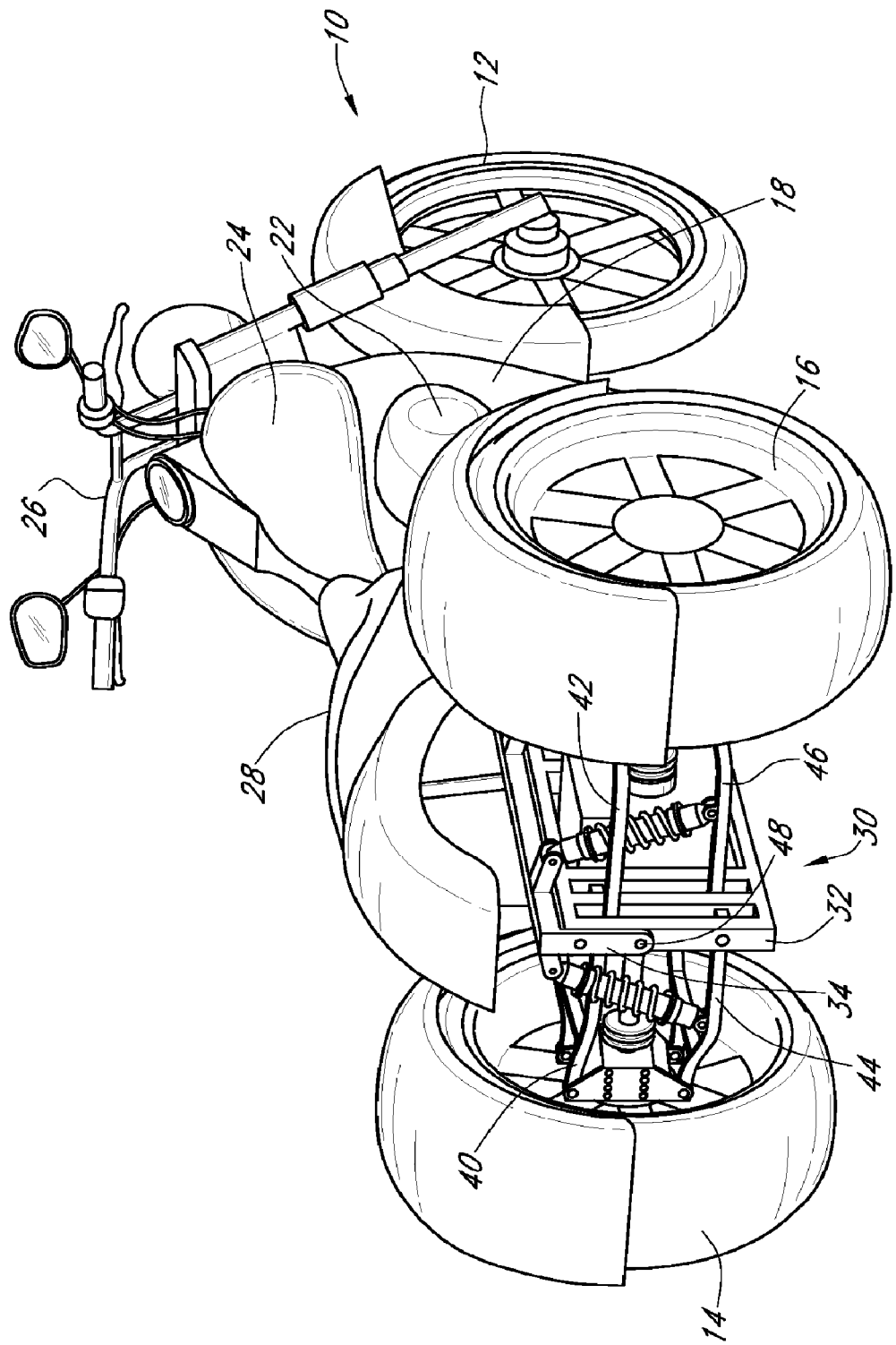
FIG. 1 is a right rear perspective of a rear wheel driven tricycle according to my invention.

FIG. 1 shows a motorized tricycle 10 equipped with the suspension assembly 30 which is the subject of this specification. In FIG. 1, tricycle 10 is shown with its front wheel 12 positioned in a straight-ahead direction. With the front wheel 12 positioned straight ahead, the tricycle 10 is fully upright.

Tricycle 10 includes main frame 18 which supports engine/transmission 22, fuel tank 24 and seat 28. Front steering assembly 26 is pivotably retained to main frame 18 such that front wheel 12 may be steered. Main frame 18 is supported by front wheel 12 and by dual rear wheels 14, 16.

Referring to FIGS. 1-6, fixed longitudinally to main frame 18 is central frame 32 to which are attached elongate upper control arms 40, 42 and elongate lower control arms 44, 46. Control arms 40, 42, 44, 46 are also commonly referred to as A arms. Each control arm 40, 42, 44, 46 is pivotably retained to central frame 32 in a common plane defined by the central frame 32. Central frame 32 is generally formed as a rectangular plate.

Inverted rocking assembly 34 is free to pivot about pivot axle pins 48, 49 retained to central frame 32. It can be seen that central frame 32 defines a plane which is substantially vertical when suspension assembly 30 is in its non-leaning position, such as when front wheel 12 is positioned for straight ahead movement. However, when tricycle 10 is leaned left or right in turns, central frame 32 is free to lean with the main frame 18 of tricycle 10 because central frame 32 is fixed to the main frame 18.

Figure 2:
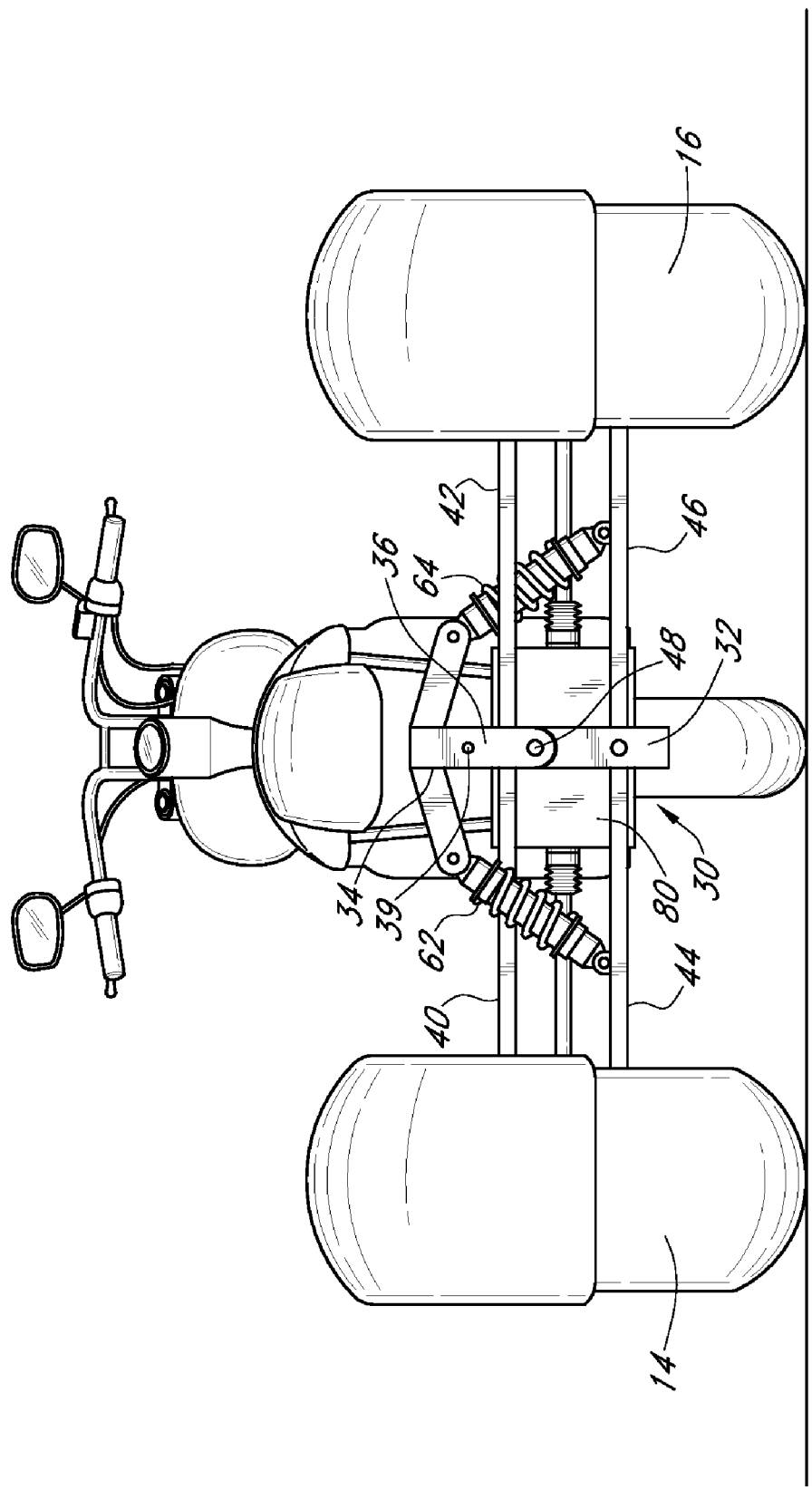
FIG. 2 is a rear elevation of the tricycle of FIG. 1.
Figure 3:
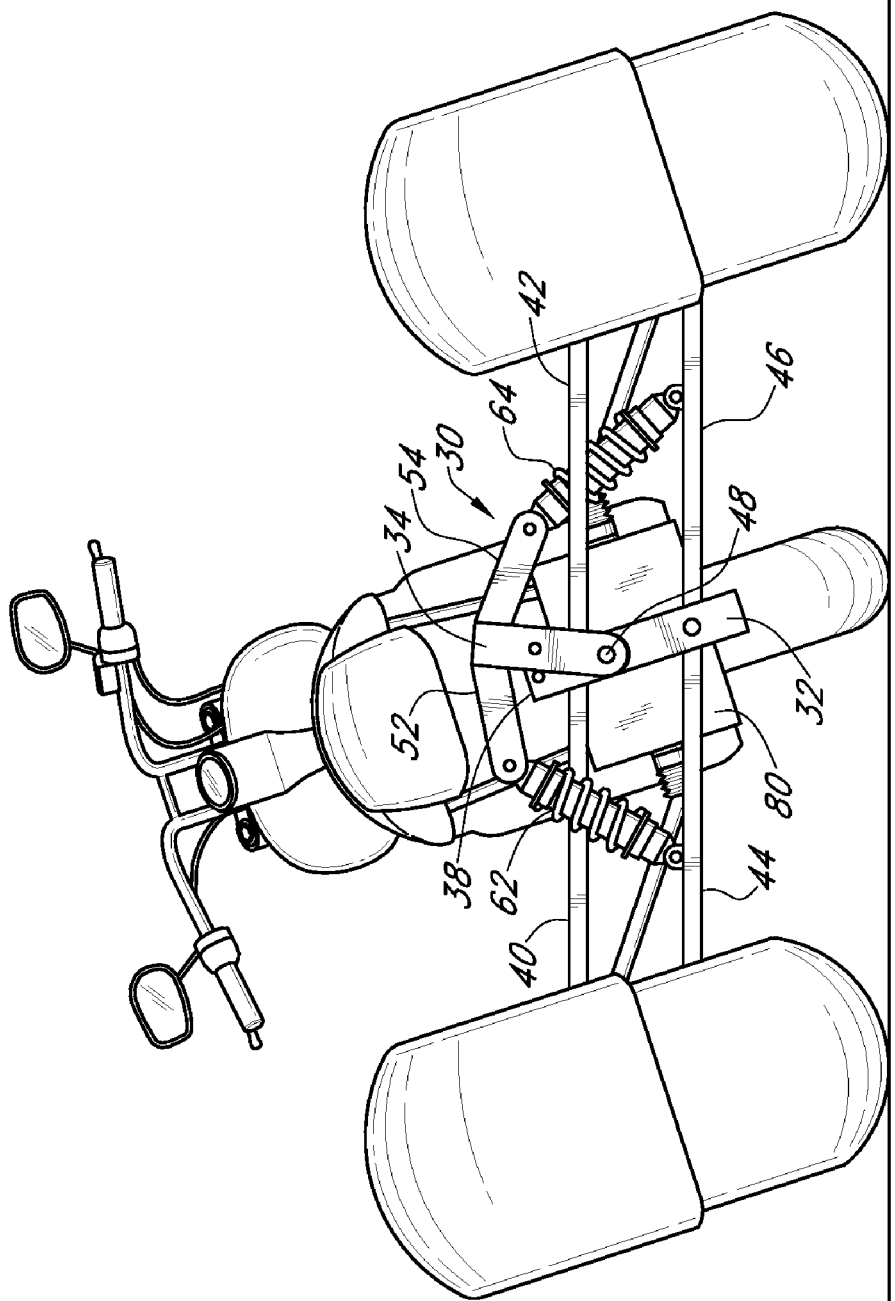
FIG. 3 is a rear elevation of the tricycle of FIG. 1 in a leftward leaning position.
Figure 4:
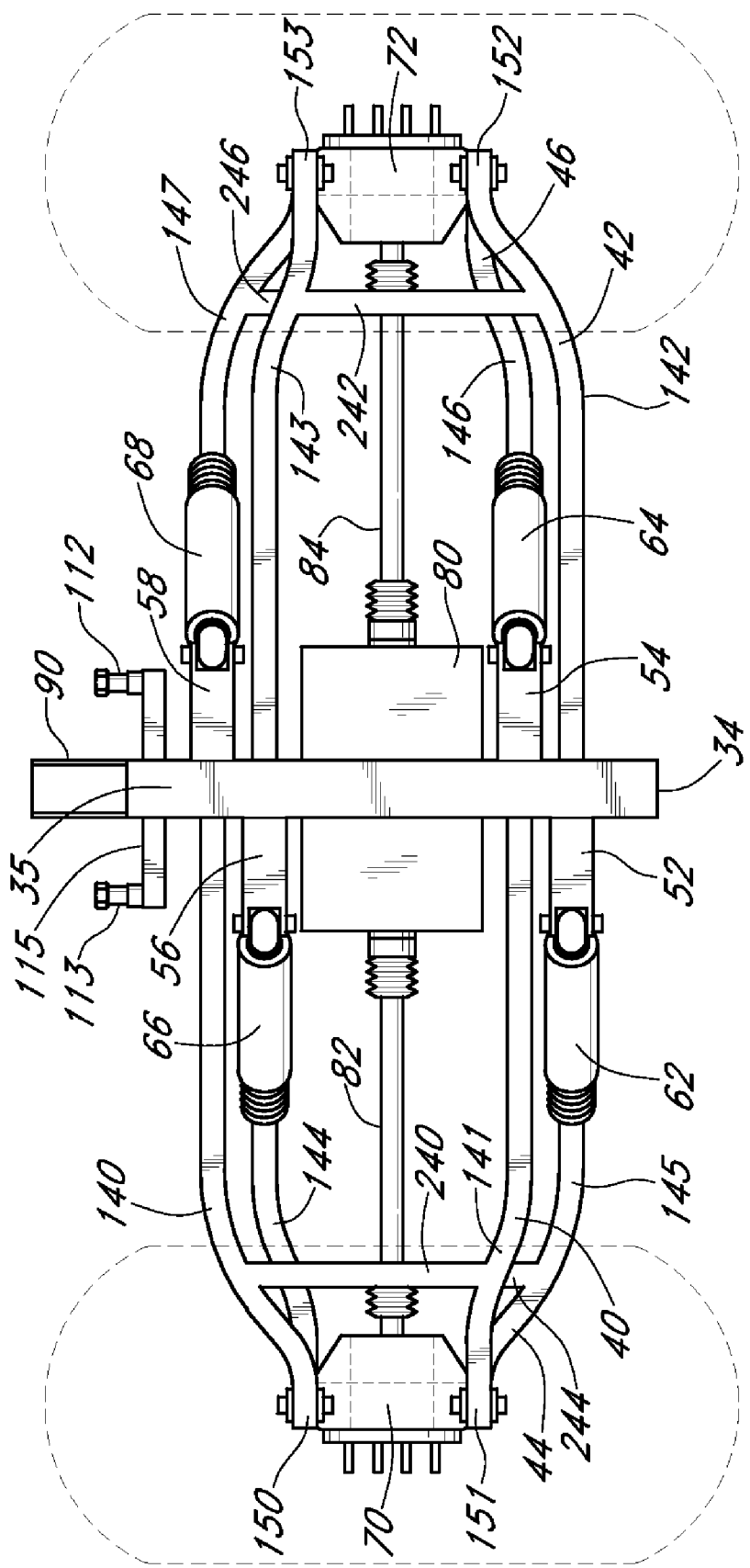
FIG. 4 is a top view of the suspension assembly for the tricycle of FIGS. 1-3.

Referring now specifically to FIGS. 2-4, inverted rocking assembly 34 is seen to include pivot arm 36 which is hinged to pivot axle pin 48 retained to central frame 32 such that inverted rocking assembly 34 may rotate from side to side about pivot pins 48, 49 while rocking over the top 134 of central frame 32.

Left upper control arm 40 comprises tie rods 140, 141 which are interconnected by cross bar 240 near left wheel bearing housing 70. Similarly, right upper control arm 40 comprises tie rods 142, 143 which are interconnected near right wheel bearing housing 72 by cross bar 242.

Likewise, left lower control arm 44 comprises tie rods 144, 145 which are joined together near left wheel bearing housing 70 by cross bar 244, while right lower control arm 46 comprises tie rods 146, 147 which are interconnected by cross bar 246 near right wheel bearing housing 72. Each tie rod of tie rod pairs 140, 141; 142, 143; 144, 145; and 146, 147 is essentially a mirror image of the other of the pair. Cross bars 240, 242, 244, 246 stabilize the tie rods. Other configurations of control arms 40, 42, 44, 46 may be utilized, but all must have proximal ends pivoting in a common plane and distal ends which are pivotably attached to bearing housings 70, 72 so that bearing housings 70, 72 may lean consistently with central frame 32.

Inverted rocking assembly 34 is provided with attachment arms 52, 54, 56, 58 which extend from opposite sides of longitudinal beam 35 of inverted rocking assembly 34 and provide attachment points for upper ends of damping links, typically shock absorbers 62, 64, 66, 68. Shock absorbers 62, 66 are pivotably retained to tie rods 144 and 145 respectively of left lower control arm 44. Similarly, shock absorbers 64, 68 are pivotably retained to tie rods 146, 147, respectively, of right lower control arm 46. Shock absorbers 62, 66 generally parallel each other as do shock absorbers 64, 68.

Struts 110, 111 interconnect suspension assembly 30 to main frame 18 of tricycle 10.

Opening 39 is provided in pivot arm 36 to receive a pin or bolt to lock suspension assembly 30 in a non-leanable position when that is desired.

From FIG. 4, in particular, it can be seen that attachment arms 52, 54, 56, 58 are offset along beam 35 of inverted rocking assembly 34, such that each attachment arm is vertically aligned with a tie rod of the lower control arm which is interconnected to the attachment arm by the shock absorber. For instance, attachment arm 58 overlies and is vertically aligned with tie rod 147 of right lower control arm 46 and is attached thereto by shock absorber 68.

From FIG. 4, it can also be seen that distal ends 152, 153 of tie rods 142, 143 of right upper control arm 42 are mounted to right wheel bearing housing 72 at its top and it is to be understood that the distal ends of tie rods 146, 147 of right lower control arm 46 are also mounted to right wheel bearing housing 72 at its bottom.

Similarly, distal ends 150, 151 of tie rods 140, 141 of left upper control arm 40 are mounted to the top of left wheel bearing housing 70 while the distal ends of tie rods 142, 143 of left lower control arm 42 are mounted to the bottom of the left wheel bearing housing 70. The distal ends of tie rods 140, 141 and 144, 145 are preferably joined to left bearing housing 70 in a common plane and that plane will generally be vertical when tricycle 10 is not leaning. The distal ends of the tie rods are pivotally retained to the wheel bearing housing such that wheel bearing housings 70, 72 will lean equally with the lean of central frame 32.

FIG. 4 also discloses that a differential gear assembly 80 is generally centrally located between wheel bearing housings 70, 72 and is supported in central frame 32. Motive drive is provided to the rear wheels 14, 16 by left axle 82 and right axle 84.

In this top view of FIG. 4, strut mountings 112, 113 can be seen to extend from opposing ends of cross member 115 which is secured by welding or other robust securing means to central frame 32 at front edge 132 thereof. Cross member 115 therefore moves with central frame 32 as it leans left or right.

Figure 5:
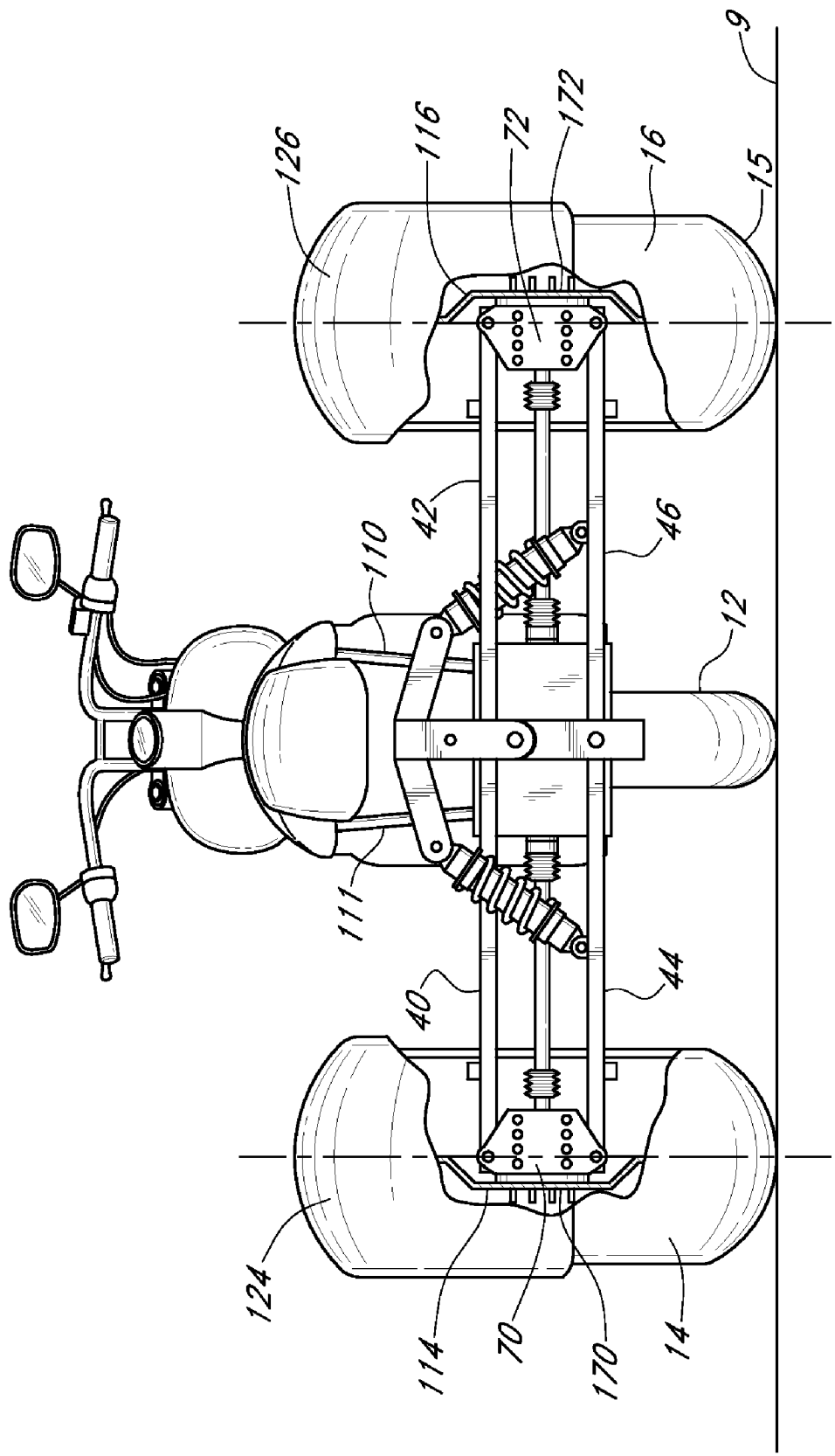
FIG. 5 is a rear elevation of the tricycle of FIGS. 1-3 with the tires and fender partly cut away.

FIG. 5 shows the tricycle 10 from its rear end with sections of the rear wheels 14, 16 and rear fenders 124, 126 partly cut away to reveal the geometry of the wheel mounting hubs 170, 172 relative to the distal ends of the control arms 40, 42, 44, 46. To operate properly, it is critical that the connections between control arms 40, 42, 44, 46 and bearing housings 70, 72 be aligned with the vertical centerlines of wheels 14, 16 respectively. Therefore, rims 114, 116 of wheels 14, 16 are formed such that wheel mounting hubs 170, 172 are positively offset from the vertical centerlines of the wheels 14, 16.

In FIG. 5 it is seen that wheels 14, 16 are preferably rounded such that the tire profile 15 of each wheel is tangential to the ground surface 9 on which it is supported.

Figure 6:
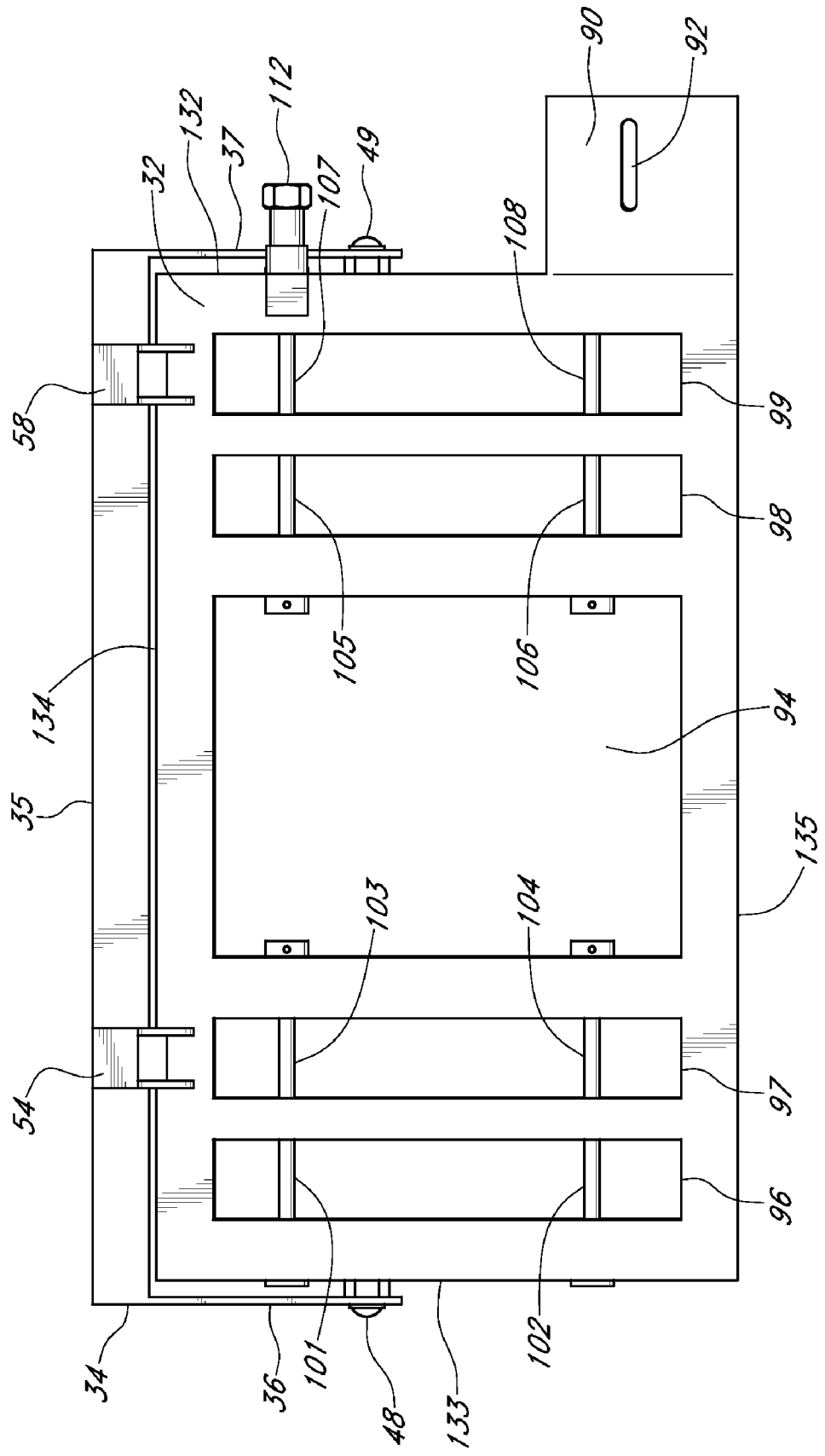
FIG. 6 is a right side view of the central frame and inverted rocker assembly of the invention with parts omitted.

FIG. 6 shows the central frame 32 of suspension assembly 30 in a right side view with inverted rocking assembly 34 mounted thereto but with the control arms, differential gear assembly and shock absorber components omitted. It can be seen that inverted rocking assembly 34 includes both front pivot arm 37 and rear pivot arm 36. Inverted rocking assembly 34 is hinged to central frame 32 by pivot pins 48, 49 which are coaxially located along the front and rear edges 132, 133 of central frame 32, preferably at about one-half of the distance between top 134 and bottom 135 of central frame 32 and more preferably at about one-third of the distance between top 134 and bottom 135 of central frame 32.

A mounting extension 90 extends forward from front edge 132 of central frame 32 to provide structure for attachment to the main frame 18 of the tricycle 10. Mounting extension 90 may be secured to main frame 18 by a suitable bolt inserted through longitudinally elongated opening 92 such that limited longitudinal adjustment of central frame 32 relative to main frame 18 may be accomplished for purposes such as chain tightening.

Central frame 32 comprises central opening 94 into which differential gear assembly 80 may be mounted and supported. Vertically elongate mounting openings 96, 97, 98, 99 contain pintles 101, 102, 103, 104, 105, 106, 107, 108 to which the proximal ends of tie rods 140, 142, 144, 146 of control arms 40, 42, 44 and 46 may be connected so that control arms 40, 42, 44, 46 may pivot freely yet be retained to central frame 32. Specifically, left upper control arm 40 is hinged to central frame 32 by retention thereto by pintles 103, 107. Right upper control arm 42 is hinged to central frame 32 by pintles 101, 105. Pintles 101, 103, 105, 107 define a first axis. Left lower control arm 44 is hinged to central frame 32 by pintles 102, 106 and right lower control arm 46 is hinged to central frame 32 by pintles 104, 108. Pintles 102, 104, 106, 108 define a second axis located below and parallel to the first axis defined by pintles 101, 103, 105, 107. It can therefore be understood that upper control arms 40, 42 are aligned horizontally but offset laterally, therefore upper control arms 40, 42 are substantially coplanar. Lower control arms 44, 46 are likewise aligned horizontally but offset laterally and coplanar. In addition, right upper control arm 40 is offset laterally from lower control arm 44 at its connection to central frame 32 and left lower control arm 46 is likewise offset laterally from left upper control arm 42 at its hinged connection to central frame 32. All pintles of central frame 32 share a common plane.

On the other hand, as seen in FIG. 4, the distal ends of left control arms 40, 44 are aligned at left bearing housing 70 and distal ends of right control arms 42, 46 are likewise aligned on right bearing housing 72 in a common plane which is substantially vertical when suspension assembly 30 is in its non-leaning position.

FIG. 6 also reveals that beam 35 of inverted rocking assembly 34 is spaced apart at least a small distance from top 134 of central frame 32 so that inverted rocking assembly 34 may move freely about its pivot connection to pivot pins 48, 49.

Figure 7:
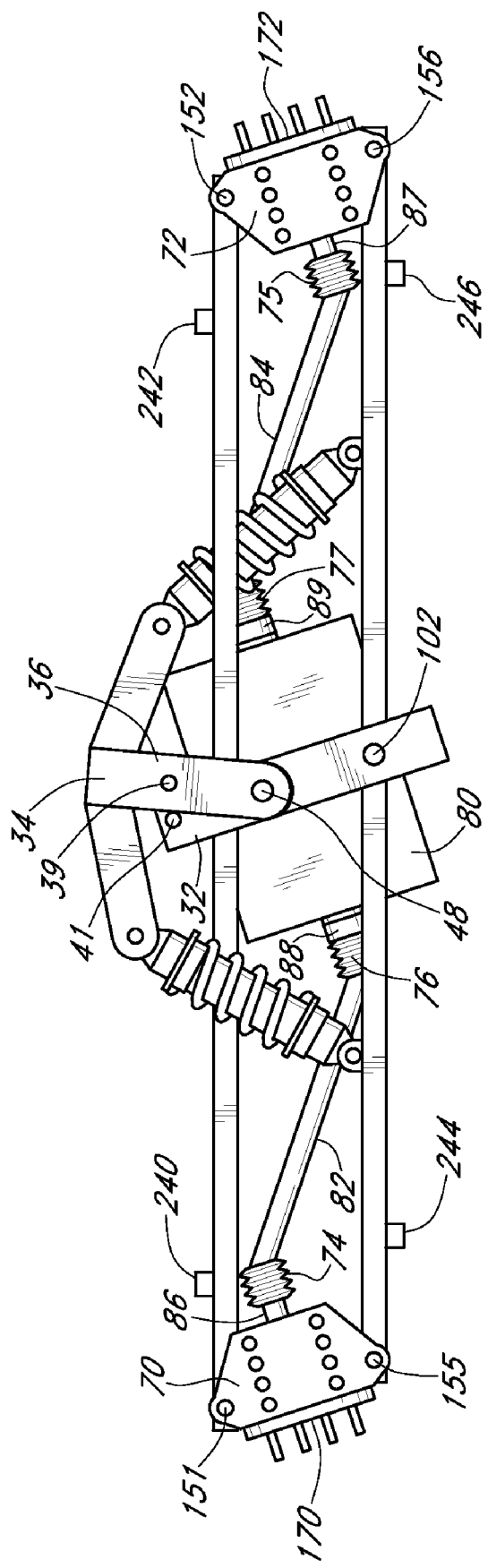
FIG. 7 is a rear elevation of the suspension assembly according to the present invention, the suspension assembly being shown in a left leaning orientation.

FIG. 7 shows the suspension assembly 30 isolated with parts thereof omitted for purposes of clarity.

In the illustration of FIG. 7, suspension assembly 30 is shown as it would appear when the tricycle to which it is mounted is leaning to the left. It can be seen that central frame 32 is leaning to the left yet is still parallel to the wheel mounting hubs 170, 172 such that, as shown in FIG. 3, wheels 14, 16 will lean left at the same angle as central frame 32. Control arms 40, 42, 44, 46 remain parallel to each other and with wheel mounting hubs 170, 172 define a parallelogram throughout all leaning movement of suspension assembly 30. Inverted rocking assembly 34 pivots to the right as central frame 32 leans left. Inverted rocking assembly 34 rocks to the right due to urging by shock absorbers 62, 64, 66, 68. Conversely, inverted rocking assembly 34 pivots to the left side of central frame 32 when central frame 32 leans to the right.

Due to lean of central frame 32, wheel bearing housings 70, 72 are forced into an identical lean by control arms 40, 42, 44, 46. The leaning of central frame 32 also moves differential gear assembly 80 into a leaned position. Therefore, axles 82, 84 disalign from coaxial alignment with stub axles 86, 87, 88, 89 which obtains when central frame is vertically disposed.

It can also be seen in FIG. 7 that left inner stub axle 88 extends from differential gear assembly 80 and couples it to left inner CV joint 76. Left axle 82 interconnects left inner CV joint 76 to left outer CV joint 74 which is coupled to left wheel bearing housing 70 by outer left stub axle 86. Similarly, inner right stub axle 89 couples differential assembly 80 to inner right CV joint 77 which couples inner right stub axle 89 to right axle 84 which couples to right outer CV joint 75. Right outer CV joint 75 is coupled to right wheel bearing housing 72 by outer right stub axle 87. The use of longitudinal sliding joints such as splined couplings allows effective changes in length of the axles to be tolerated.

An optional stop member which is preferably a removable bolt or pin may be inserted through opening 39 of pivot arm 36 into receiving opening 41 of central frame 32 along rear edge 133 when lean of suspension 30 is to be prevented. Insertion of a bolt or pin through opening 39 into receiving opening 41 prevents lean of the suspension assembly 30 because inverted rocking assembly 34 is prevented from pivoting about pivot pin 48.

Figure 8:
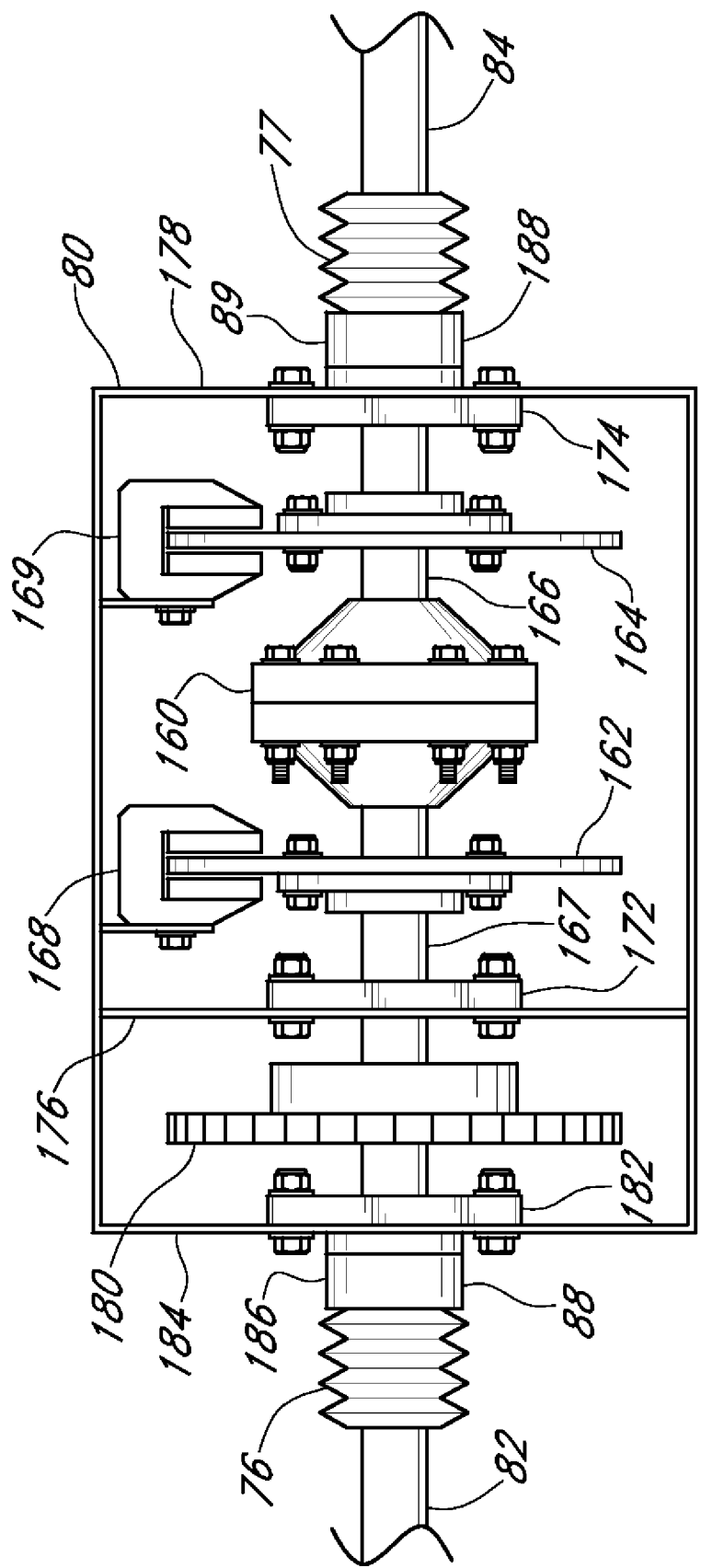
FIG. 8 is an isolated view of the differential gear enclosure of the invention with the rear wall thereof removed.

FIG. 8 shows the internal elements of differential gear assembly 80. Centrally located within differential gear assembly 80 and centered on the centerline of the tricycle 10 are differential gears 1.60. Brake discs 162 (left) and 164 (right) are spaced apart from differential gears 160 a small distance on opposing sides of differential gears 160 and are supported on gear shafts 166, 167. Caliper assemblies 168, 169 are associated with each of brake discs 162, 164. Flanged bearing housings 172, 174 are mounted to bearings 176, 178 of differential gear assembly 80.

Internally splined couplers 186, 188 are fixed to gear shafts 167, 166 respectively and receive inner stub axles 88, 89 respectively. Inner stub axles 88, 89 are coupled to CV joints 76, 77 respectively. Left drive axle 82 and right drive axle 84 are shown coupled to CV joints 76, 77 and are partly cut away in this figure.

Also carried on and fixed to gear shaft 167 is sprocket 180 which transmits engine power to the gear shaft 167 which drives the differential gears 160 causing it to transmit rotary drive to right gear shaft 166. Left outer flanged bearing housing 182 is supported on left support plate 184 of differential gear assembly 80. It should be understood that sprocket 180 may be relocated to a position to the right of differential gears 160 when the engine drive sprocket is located on the right side of the tricycle frame 18. In addition, sprocket 180 may be substituted with a belt pulley when the engine/transmission 22 of the tricycle 10 is equipped with belt drive. For engine/transmissions on certain shaft driven motorcycles, a ring and pinion gear may substitute for sprocket 180.

Figure 9:
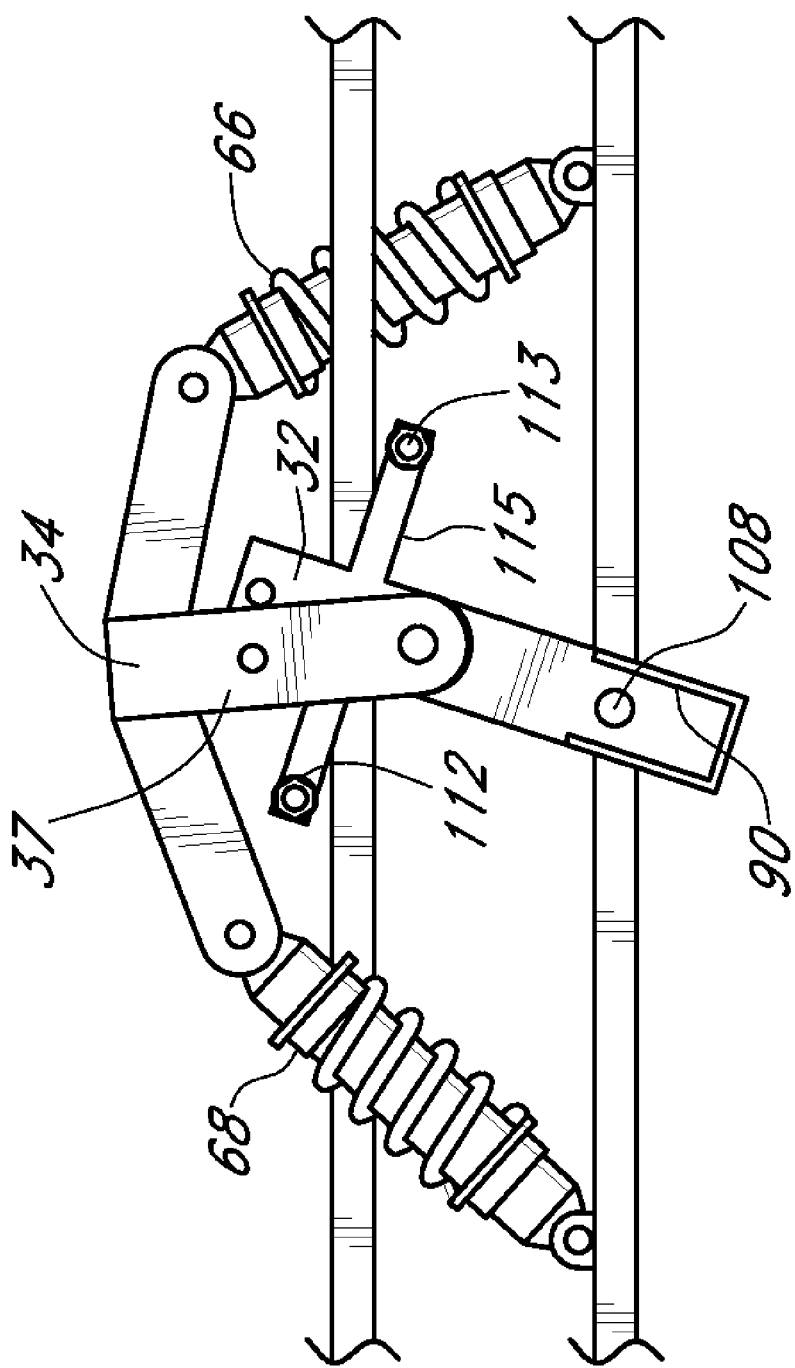
FIG. 9 is a front elevation of the suspension assembly with distal ends cut away and with the suspension assembly being shown in the left leaning orientation.

FIG. 9 illustrates the suspension assembly 30 from the front thereof. Cross member 115 is part of or fixed to central frame 32 and strut mountings 112, 113 extend forward thereof at the opposing ends of cross member 115. In FIG. 9, suspension assembly 30 is shown leaning to the left. The end of pintle 108 may be seen aligned with the lower control arms as the lower pintles 102, 104, 106, 108 are coaxial and the lower control arms 44, 46 are hinged to pintles 102, 104, 106, 108 at their proximal ends. Inverted rocking assembly 34 has rotated on central frame 32 in the direction opposite to the lean orientation of central frame 32.

Optionally, depending on the gearing of a motorcycle to be converted to a tricycle by use of this suspension assembly 30, a counter shaft optionally may be located in central mounting opening 94 and used for gear reduction or to change differential axle assembly options. The counter shaft would be coupled to a sprocket driven chain or belt pulley from the transmission and further coupled to a gear assembly which drives a complementary gear or belt pulley mounted to gear shaft 166 or 167 of differential gear assembly 80.

Though the preferred embodiment of FIGS. 1-9 includes differential gears 160 in the drive train of the suspension assembly 30, it is possible to use the suspension assembly 30 when a single axle is used to drive each of wheels 14, 16. With no differential gear, a single axle would connect via CV joints to stub axles extending inboard from the wheel bearing housings 70, 72 so that the axle could divert from horizontal orientation when the main frame 18 of tricycle 10 is in a leaning position.

Figure 10:
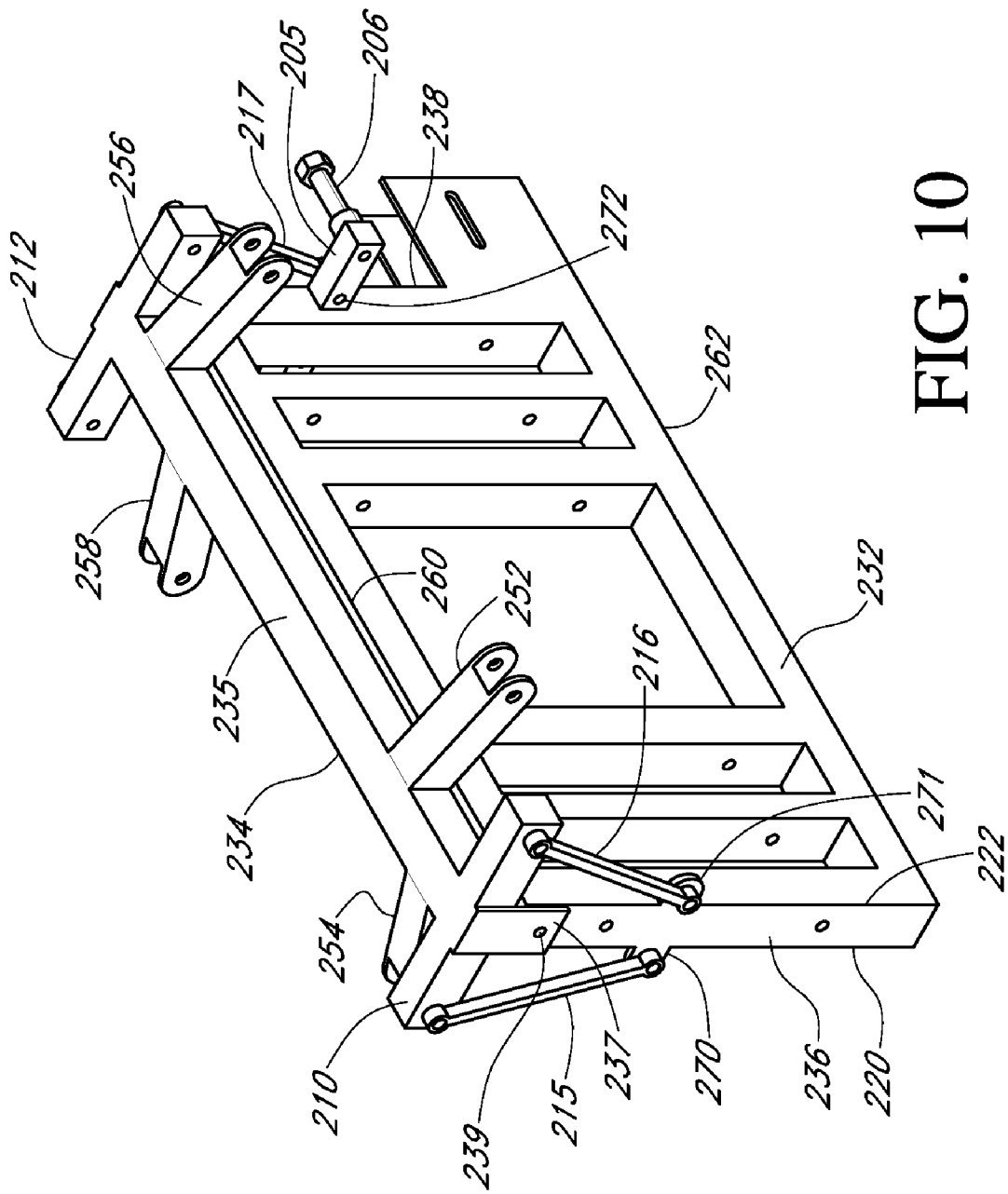
FIG. 10 is a right rear perspective of an alternative embodiment of the rocking assembly and central frame components of the suspension invention.

FIG. 10 illustrates a variant of the suspension assembly of the present invention. In the suspension assembly of FIG. 10, alternative embodiment central frame 232 differs from central frame 32 of FIGS. 1-8, including tabs 270, 271 extending from opposing sides 220, 222 of rear end 236 of central frame 232. Tabs 270, 271 provide attachment points on central frame 232 for hinging pivot arms 215, 216 to central frame 232.

Pivot arms 215, 216 depend from transverse member 210 of alternative embodiment rocking assembly 234 which rotates over the top 260 of central frame 232. Rocking assembly 234 comprises, in this embodiment, an elongate beam 235 having transverse member 210 at one end and another transverse member 212 at its opposing end. Like transverse member 210, transverse member 212 includes depending pivot arms (only pivot arm 217 is visible in this view) which are hinged to cross member 205 which carries strut mounting 206 at its free end.

Extending from beam 235 are short attachment arms 252, 254, 256, 258 which provide attachment points for shock absorbers (omitted from this view). As seen, attachment arms 252, 256 extend from the right hand side of beam 235 and attachment arm 254, 258 extend from opposing left hand side of beam 235. The attachment arms are staggered such that each attachment arm will overlie a lower central arm (See FIG. 4) which will be a lower terminus for a shock absorber.

Beam 235 overlies top 260 of central frame 232 at a small separation such that as central frame 232 leans left, beam 235 will rock toward the right side of central frame 232 and conversely, as central frame 232 leans right, rocking member 234 will move to the left of top 260 of central frame 232.

Because of the horizontal separation of tabs 270, 271 and the pivot hinge mounting 272 (and an opposing pivot hinge mounting not visible in FIG. 10) along cross member 205, the movement of rocking member 234 will follow an elliptical path. Strut mount 206 extends from the free end of cross member 205, cross member 205 being formed with or securely attached to front end 238 of central frame 232 and perpendicular thereto.

Pivot mounting tabs 270, 271 and opposing similar pivot attachments (including hinge pin mounting 272) are located at substantially the same distance from bottom 262 of central frame 232. Preferably, the pivot points provided by tabs 270, 271 and hinge pin mounting 272 are at approximately one-half of the distance from bottom 262 to top 260 of central frame 232. More preferably, the pivot points provided by tabs 270, 271 and hinge pin mounting 272 are at least two-thirds of the distance from bottom 262 to top 260 of central frame 232.

It is contemplated that the pivot attachments of rocker 234 may be located along the length of central frame 232 and are not limited to their illustrated location at the front end 238 and rear end 236 of central frame 232. In addition, other configurations of struts 215, 216, 217, and 218 may be utilized and are not limited to those as illustrated.

Rear transverse member 210 includes a lock up tab 237 depending generally from the midpoint of transverse member 210. Lock up tab 237 includes hole 239 which may selectively receive a locking pin to lock alternative rocking assembly 234 to central frame 232 when the locking pin is inserted through hole 239 into an aligned opening in rear end 236 of central frame 232. Insertion of a locking pin through hole 239 into the aligned opening in rear end 236 of the central frame 232 is accomplished when the user desires to prevent the suspension assembly from being capable of leaning.

Another alternative embodiment of the invention may include shock absorbers 62, 64, 66, 68 which are variable in damping effect, such as with pneumatic shock absorbers which may be adjusted with addition of compressed air. In that case, appropriate ductwork will be added to the suspension assembly 30 to allow compressed air to be added or exhausted from shock absorbers 62, 64, 66, 68.

Though a rear drive tricycle 10 is illustrated in the drawings, it is contemplated that suspension assembly 30 may be utilized with non-driven wheels in applications in which differential gear 160 is not used

Having thus described the invention in connection with the preferred embodiments thereof, it will be evident to those skilled in the art that various revisions can be made to the preferred embodiments described herein with out departing from the spirit and scope of the invention. It is my intention, however, that all such revisions and modifications that are evident to those skilled in the art will be included with in the scope of the following claims.

What is claimed is:

1. A suspension for a motorized vehicle having a steerable front wheel, a pair of spaced apart rear wheels and an elongate frame supporting an engine, a transmission and a driver's seat, the invention comprising a central frame member longitudinally fixed to the elongate frame of the motorized vehicle, the central frame member oriented substantially perpendicularly to a surface on which the motorized vehicle is supported when the suspension is in a non-leaning position, the central frame member oriented at a substantial nonperpendicular to the surface on which the motorized vehicle is supported when the suspension is in a leaning position, the central frame member having a left side and an opposing right side, the central frame member further comprising a top edge and bottom edge, a first upper control arm hinged at a proximal end thereof to the central frame member and extending from the left side thereof, the first upper control arm hinged at a distal end thereof to a left wheel mounting assembly, a second upper control arm hinged at a proximal end thereof to the central frame member and extending from the right side thereof, the second upper control arm hinged at a distal end thereof to a right wheel mounting assembly, a first lower control arm hinged at a proximal end thereof to the central frame member and extending from the left side thereof, the first lower control arm hinged at a distal end thereof to a left wheel mounting assembly, a second lower control arm hinged at a proximal end thereof to the central frame member and extending from the right side thereof, the second lower control arm hinged at a distal end thereof to the right wheel mounting assembly, the proximal ends of the first and second upper control arms defining a first axis aligned with a plane defined by the central frame member, the proximal ends of the first and second lower control arms defining a second axis aligned with the plane defined by the central frame member, the first upper control arm substantially parallel to the first lower control arm, the second upper control arm substantially parallel to the second lower control arm, the first upper control arm substantially coplanar with the second upper control arm, the first lower control arm substantially coplanar with the second lower control arm, a rocking member pivotally retained to the central frame member, the rocking member disposed over the top edge of the central frame member when the suspension is in the non-leaning position, the rocking member pivotal about an axis located between the top edge and a bottom edge of the central frame member, the rocking member including a left side and an opposing right side, at least one connection element extending from each of the left side and the opposing right side of the rocking member, a first damping member interconnecting the at least one connection element extending from the left side of the rocking member to the first lower control arm, a second damping member interconnecting the at least one connection element extending from the right side of the rocking member to the second lower control arm, the pair of rear wheels comprises a left side wheel and a right side wheel, the left side wheel mounted to the left side wheel mounting assembly, the right side wheel mounted to the right side wheel mounting assembly, each of the left side wheel and the right side wheel having a vertical centerline, each of the distal ends of the first upper control arm and the first lower control arm defining a plane substantially coplanar with the vertical centerline of the left side wheel,
each of the distal ends of the second upper control arm and the second lower control arm defining a plane substantially coplanar with the vertical centerline of the right side wheel,
a drive member selectively driving the rear wheels,
the elongate frame of the vehicle leaning to the left when the suspension is in a left leaning position and the elongate frame of the vehicle leaning to the right when the suspension is in a right leaning position,
the rocking member pivoting to the right side of the central frame member when the suspension is in a left leaning position and the rocking member pivoting to the left side of the central frame member when the suspension is in a right leaning position.

2. The suspension for a motorized vehicle of claim 1 wherein
the first upper control arm comprises first and second left side upper rod members hinged at proximal ends thereof to the central frame member,
the proximal ends of the first and second left side upper rod members spaced horizontally apart,
the second upper control arm comprises first and second right side upper rod members hinged at proximal ends thereof to the central frame member,
the proximal ends of the first and second right side upper rod members spaced horizontally apart,
each of the first and second right side upper rod members including a distal end opposing the proximal end thereof,
the distal ends of each of the first and second right side upper rod members hinged to the right side wheel mounting assembly,
each of the first and second left side upper rod members including a distal end opposing the proximal end thereof,
the distal ends of each of the first and second left side upper rod members hinged to the left side wheel mounting assembly.

3. The suspension for a motorized vehicle of claim 2 wherein
the first lower control arm comprises first and second left side lower rod members hinged at proximal ends thereof to the central frame member,
the proximal ends of the first and second left side lower rod members spaced horizontally apart,
the second upper control arm comprising first and second right side lower rod members hinged at proximal ends thereof to the central frame member,
the proximal ends of the first and second right side lower rod members spaced horizontally apart,
each of the first and second right side lower rod members including a distal end opposing the proximal end thereof,
the distal ends of each of the first and second right side lower rod members hinged to the right side wheel mounting assembly,
the distal ends of each of the first and second left side lower rod members hinged to the left side wheel mounting assembly.

4. The suspension for a motorized vehicle of claim 3 wherein
the first and second left side upper rod members are joined by a cross bar,
the first and second right side upper rod members are joined by a cross bar,
the first and second left side lower rod members are joined by a cross bar,
the first and second right side lower rod members are joined by a cross bar.

5. The suspension for a motorized vehicle of claim 1 wherein
the first lower control arm comprises first and second left side lower rod members hinged at proximal ends thereof to the central frame member,
the proximal ends of the first and second left side lower rod members spaced horizontally apart,
the second upper control arm comprises first and second right side lower rod members hinged at proximal ends thereof to the central frame member,
the proximal ends of the first and second right side lower rod members spaced horizontally apart,
each of the first and second right side lower rod members including a distal end opposing the proximal end thereof,
the distal ends of each of the first and second right side lower rod members hinged to the right side wheel mounting assembly,
each of the first and second left side lower rod members including a distal end opposing the proximal end thereof,
the distal ends of each of the first and second left side lower rod members hinged to the left side wheel mounting assembly.

6. The suspension for a motorized vehicle of claim 1 wherein
the central frame member comprises a front edge and a rear edge,
the rocking member including a first pivot arm at a front end thereof and a second pivot arm at a rear end thereof,
the first pivot arm of the rocking member pivoting about a first pivot pin retained to the front edge of the central frame member,
the second pivot arm of the rocking member pivoting about a second pivot pin retained to the rear edge of the central frame member,
the first pivot pin coaxial with the second pivot pin.

7. The suspension for a motorized vehicle of claim 6 wherein
the first pivot pin and the second pivot pin are disposed approximately midway between the top edge and the bottom edge of the central frame member.

8. The suspension for a motorized vehicle of claim 6 wherein
the first pivot pin and the second pivot pin are disposed at approximately one-third of the distance between the top edge and the bottom edge of the central frame member.

9. The suspension for a motorized vehicle of claim 1 wherein
a differential is operatively connected to the left and right wheel mounting assemblies,
the differential mounted in a void in the central frame member.

10. The suspension for a motorized vehicle of claim 1 wherein
the first upper control arm comprises first and second left side upper rod members hinged at proximal ends thereof to the central frame member,
the proximal ends of the first and second left side upper rod members spaced horizontally apart, the second upper control arm comprises first and second right side upper rod members hinged at proximal ends thereof to the central frame member, the proximal ends of the first and second right side upper rod members spaced horizontally apart, each of the first and second right side upper rod members including a distal end opposing the proximal end thereof, the distal ends of each of the first and second right side upper rod members hinged to the right side wheel mounting assembly, the distal ends of each of the first and second left side upper rod members hinged to the left side wheel mounting member, the first lower control arm comprising first and second left side lower rod members hinged at proximal ends thereof to the central frame member, the proximal ends of the first and second left side lower rod members spaced horizontally apart, the second upper control arm comprises first and second right side lower rod members hinged at proximal ends thereof to the central frame member, the proximal ends of the first and second right side lower rod members spaced horizontally apart, each of the first and second right side lower rod members including a distal end opposing the proximal end thereof, the distal ends of each of the first and second right side lower rod members hinged to the right side wheel mounting assembly, the distal ends of each of the first and second left side lower rod members hinged to the left side wheel mounting assembly, the first lower control arm comprising first and second left side lower rod members hinged at proximal ends thereof to the central frame member, the proximal ends of the first and second left side lower rod members spaced horizontally apart, the second upper control arm comprising first and second right side lower rod members hinged at proximal ends thereof to the central frame member, the proximal ends of the first and second right side lower rod members spaced horizontally apart, each of the first and second right side lower rod members including a distal end opposing the proximal end thereof, the distal ends of each of the first and second right side lower rod members hinged to the right side wheel mounting assembly, the distal ends of each of the first and second left side lower rod members hinged to the left side wheel mounting assembly, the first and second left side upper rod members joined by a cross bar, the first and second right side upper rod members joined by a cross bar, the first and second left side lower rod members joined by a cross bar, the first and second right side lower rod members joined by a cross bar, the central frame member further comprising a front edge and a rear edge, the rocking member including a first pivot arm at a front end thereof and a second pivot arm at a rear end thereof, the first pivot arm of the rocking member pivotable about a first pivot pin retained to the front edge of the central frame member, the second pivot arm of the rocking member pivotable about a second pivot pin retained to the rear edge of the central frame member, the first pivot pin coaxial with the second pivot pin, the first pivot pin and the second pivot pin disposed between the top edge and the bottom edge of the central frame member, the first pivot pin and the second pivot pin disposed approximately midway between the top edge and the bottom edge of the central frame member, the first pivot pin and the second pivot pin disposed approximately one-third of the distance between the top edge and the bottom edge of the central frame member, a differential is operatively connected to the left and right wheel mounting assemblies, the differential mounted in an opening in the central frame member.

11. A suspension for a three-wheeled vehicle having a longitudinal main frame supported by a pair of spaced apart aligned wheels and a third steerable wheel, the invention comprising a central frame removably fixed to the main frame of the vehicle, a plurality of elongate arms pivotally retained to the central frame, the plurality of elongate arms each including a proximal end hinged to the central frame, the plurality of elongate arms including:

a first upper elongate arm extending from the central frame to a mounting for a left wheel of the pair of wheels, a second upper elongate arm extending from the central frame to a mounting for a right wheel of the pair of wheels, a first lower elongate arm extending from the central frame to the mounting for the left wheel of the pair of wheels, a second lower elongate arm extending from the central frame to the mounting for the right wheel of the pair of wheels, a proximal end of the first upper elongate arm horizontally aligned with a proximal end of the second upper elongate arm and spaced apart therefrom, a proximal end of the first lower elongate arm horizontally aligned with a proximal end of the second lower elongate arm and spaced apart therefrom, the proximal ends of the first and second upper elongate arms retained to the central frame above the proximal ends of the first and second lower elongate arms, the first upper elongate arm substantially horizontally aligned with the second upper elongate arm, the first lower elongate arm substantially horizontally aligned with the second lower elongate arm, a distal end of the first upper elongate arm and a distal end of the first lower elongate arm each pivotally retained to the mounting for the left wheel, a distal end of the second upper elongate arm and a distal end of the second lower elongate arm each pivotally retained to the mounting for the right wheel, a rocking member overlying the central frame and separated therefrom by a small distance, the rocking member pivotally retained to the central frame between a top and a bottom of the central frame, the rocking member including at least one mounting on each of a left side and a right side thereof, at least one shock absorbing member interconnecting the at least one mounting on the left side of the rocking member with the first lower elongate arm, at least one shock absorbing member interconnecting the at least one mounting on the right side of the rocking member with the second lower elongate arm, the central frame leaning toward a left side of the vehicle when the vehicle is steered to the left and the central frame leaning toward a right side of the vehicle when the vehicle is steered to the right, the rocking member moving toward the right wheel when the central frame leans toward the left side of the vehicle and the rocking member moving toward the left wheel when the central frame leans toward the right side of the vehicle.

12. The suspension of claim 11 wherein each elongate arm comprises a pair of spaced apart elongate links, each link including a distal end, the distal ends of the links of the first upper elongate arm hinged to the mounting for the left wheel, the distal ends of the links of the second upper elongate arm hinged to the mounting for the right wheel, the distal ends of the links of the first lower elongate arm hinged to the mounting for the right wheel, the distal ends of the links of the second lower elongate arm hinged to the mounting for the right wheel, each link including a proximal end, the proximal ends of the links of the first upper elongate arm hinged to the central frame, the proximal ends of the links of the second upper elongate arm hinged to the central frame, the proximal ends of the links of the first lower elongate arm hinged to the central frame, the proximal ends of the links of the second lower elongate arm hinged to the central frame.

13. A suspension for a vehicle comprising a central frame defining a plane, the plane generally upright when the suspension is in a non-leaning position, the central frame leaning to the left when the suspension is in a left leaning position, the central frame leaning to the right when the suspension is in a right leaning position, the central frame having a left side and an opposing right side, the central frame further having a top and a bottom and a front edge and rear edge, a first upper control arm extending from the left side of the central frame to a mounting for a left wheel, a second upper control arm extending from the right side of the central frame to a mounting for a right wheel, a first lower control arm extending from the left side of the central frame to the mounting for the left wheel, a second lower control arm extending from the right side of the central frame to the mounting for the right wheel, each control arm pivotally retained at a proximal end thereof to the central frame, each control al n pivotal about an axis coplanar with the plane defined by the central frame, the proximal end of the first upper control arm horizontally aligned with the proximal end of the second upper control arm and spaced apart therefrom, the proximal end of the first lower control arm horizontally aligned with the proximal end of the second lower control arm and spaced apart therefrom, the first upper control arm substantially horizontally aligned with the second upper control arm, the first lower control arm substantially horizontally aligned with the second lower control arm, a distal end of the first upper control arm and a distal end of the first lower control arm each pivotally retained to the mounting for the left wheel, a distal end of the second upper control arm and a distal end of the second lower control arm each pivotally retained to the mounting for the right wheel, a rocking member overlying the central frame and separated from the top of the central frame by a small distance when the central frame is substantially upright, the rocking member pivotally retained to the central frame, the rocking member pivotal about an axis located between the top and the bottom of the central frame, the rocking member including at least one mounting element on each of a left side and a right side thereof, at least a first damping member interconnecting the at least one mounting element on the left side of the rocking member with the first lower control arm, at least a second damping member interconnecting the at least one mounting element on the right side of the rocking member with the second lower control arm, the rocking member moving toward a right side of the central frame when the central frame leans to the left and the rocking member moving toward the left side of the central frame when the central frame leans toward the right.

14. The suspension of claim 13 wherein the axis of pivot of the rocking member is located in an upper one-half of the central frame.

15. The suspension of claim 13 wherein the axis of pivot of the rocking member is located in an upper one-third of the central frame.

16. The suspension of claim 13 wherein each control arm comprises a pair of tie rods, each tie rod of the pair of tie rods of each of the control arms is a mirror image of the other tie rod of the pair of tie rods, each tie rod includes a proximal end pivotally retained to the central frame, each tie rod includes a distal end pivotally retained to a wheel mounting member, each proximal end of each tie rod of the first upper control arm is offset laterally from each proximal end of each tie rod of the second upper control arm, each tie rod of the first upper control arm is coplanar with each tie rod of the second upper control arm, each lower control arm is parallel to each upper control arm.

17. The suspension of claim 13 wherein the rocking member includes a pair of pivot arms, a first of the pivot arms retained to a first pivot pin on a the front edge of the central frame, a second of the pivot aims retained to a second pivot pin on a the rear edge of the central frame, the first pivot pin coaxial with the second pivot pin, the first pivot pin and the second pivot pin located upon an upper one-half of the central frame.

18. The suspension of claim 13 wherein the rocking member comprises a beam, the at least one mounting element on each side of the rocking member comprising an arm extending from the beam.

19. The suspension of claim 13 wherein the mounting for the left wheel is a left wheel bearing housing, the mounting for the right wheel is a right wheel bearing housing.

20. The suspension of claim 13 wherein
the rocking member comprises a longitudinal beam,
the longitudinal beam including at least one cross member transverse to the longitudinal beam,
the at least one cross member having opposing ends,
a pivot arm depending from each of the opposing ends of the at least one cross member,
a first of the pivot anus hinged to a first pivot connection fixed to the right side of the central frame,
a second of the pivot arms hinged to a second pivot connection fixed to the left side of the central frame.

* * * * *